(12) United States Patent
Chidley

(10) Patent No.: US 6,818,237 B2
(45) Date of Patent: Nov. 16, 2004

(54) AQUEOUS LIQUID PACKAGE

(75) Inventor: Francis John Chidley, Johannesburg (ZA)

(73) Assignee: London & Overseas Trust, Geneva (CH)

( * ) Notice: Subject to any disclaimer, the term of this patent is extended or adjusted under 35 U.S.C. 154(b) by 78 days.

(21) Appl. No.: 10/149,902

(22) PCT Filed: Dec. 21, 2000

(86) PCT No.: PCT/IB00/01932

§ 371 (c)(1),
(2), (4) Date: Jun. 17, 2002

(87) PCT Pub. No.: WO01/47375

PCT Pub. Date: Jul. 5, 2001

(65) Prior Publication Data

US 2002/0189704 A1 Dec. 19, 2002

(30) Foreign Application Priority Data

Dec. 23, 1999 (ZA) .............................................. 99/7861

(51) Int. Cl.⁷ ................................................. A23L 2/00
(52) U.S. Cl. .......................... 426/66; 210/749; 220/493; 383/117; 426/74; 426/124; 426/410; 426/411
(58) Field of Search ............................. 426/66, 74, 106, 426/112, 124, 394, 397, 398, 410, 411, 413; 210/198.1, 199, 205, 206, 263, 464, 473, 749, 266, 282, 634; 99/275; 383/117; 220/485, 493

(56) References Cited

U.S. PATENT DOCUMENTS

| 4,528,200 | A | * | 7/1985 | Coleman | 426/74 |
| 5,059,805 | A | | 10/1991 | Shimizu | |
| 5,609,759 | A | | 3/1997 | Nohren, Jr. et al. | |
| 5,636,938 | A | * | 6/1997 | Ragazzo | 405/15 |
| 5,705,210 | A | * | 1/1998 | Sillince et al. | 426/112 |

FOREIGN PATENT DOCUMENTS

| CN | 1 089 922 A | | 7/1994 |
| JP | 60-143889 | * | 7/1985 |
| JP | 62-186992 | * | 8/1987 |
| JP | 2017992 | * | 1/1990 |

* cited by examiner

Primary Examiner—Joseph Drodge
(74) Attorney, Agent, or Firm—Senniger Powers

(57) ABSTRACT

The invention provides a method of packaging an aqueous liquid whereby a charge of the liquid is charged through a closable opening into a container. A source of inorganic ions which are soluble in the liquid is also inserted into the container. The opening is then closed to retain the liquid and the source in the container. There is also provided a liquid pack comprising a container having a closable opening and an aqueous liquid in the container. A source of inorganic ions in the container contacts the liquid, the ions being soluble in the liquid and the source comprising a carrier for said ions of solid material insoluble in the liquid and having said ions sorbed thereto. The invention also provides a device comprising said source and a receptacle in which it is held captive.

15 Claims, 1 Drawing Sheet

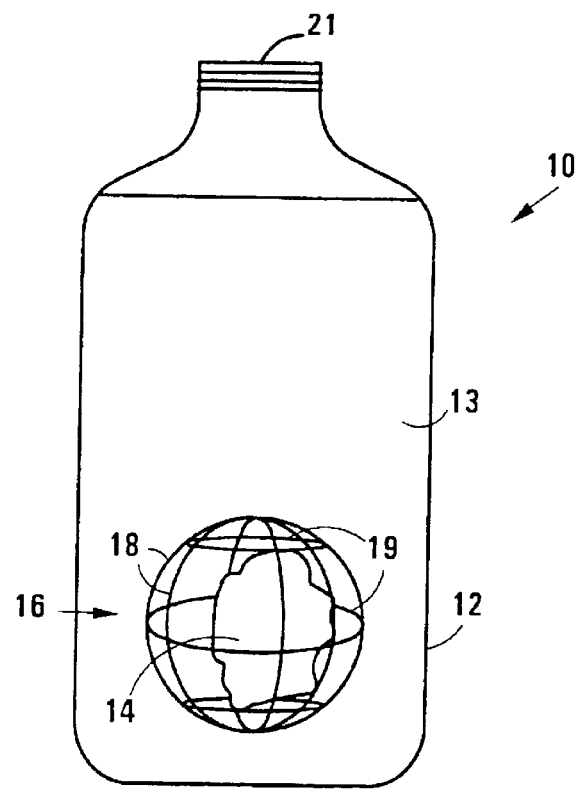
FIG 1
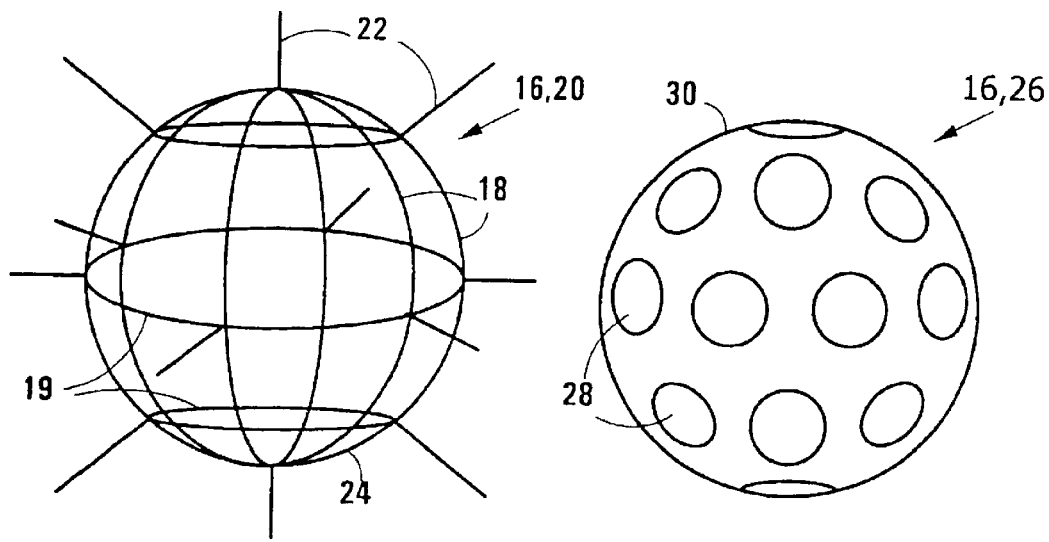
FIG 2
FIG 3

AQUEOUS LIQUID PACKAGE

This application is a 371 of PCT/1800/01932:

BACKGROUND OF THE INVENTION

THIS INVENTION relates to the packaging of aqueous liquids. More particularly, the invention relates to a method of packaging an aqueous liquid to produce a liquid pack, to a liquid pack comprising a packaged aqueous liquid, and to a device for forming part of the pack, the method, pack and device being particularly suitable for, but not restricted to, the packaging of mineral water.

By mineral water is meant water from a natural deposit such as a spring, and which has been extracted from the deposit for human consumption, but has not been treated chemically. Thus, for example, mineral water has not been chlorinated or deionised. Such mineral water is sometimes referred to as natural water or spring water, as it is of natural origin and is often found in springs. Mere physical treatment thereof, such as filtration or ultra-violet irradiation thereof for purification thereof, does not alter its character as mineral water, provided that there is no chemical treatment thereof.

The Applicant is aware of the Patent Abstracts of Japan (PAJ Abstracts) of JP 60 143889 A, JP 62 186992 A and JP 02 017992 A, and is also aware of the Derwent Abstract of CN 1 089 922 A, being abstracts of Japanese and Chinese patent applications respectively. The PAJ Abstract of JP 60 143889 A discloses a liquid pack comprising a container for holding a liquid and having a closable opening, water in the container and stones having water-soluble ions sorbed thereon, the stones being contained within a porous receptacle. The PAJ Abstract of JP 62 186992 A and the Derwent Abstract of CN 1 089 922 A both disclose porous insoluble bags containing broken or powdered mineral material such as stone wherefrom, when the bags are immersed in water, soluble ions are extracted from the mineral material into the water. Finally, the PAJ Abstract of JP 02 01 7992 A also discloses that minerals can be eluted from insoluble rocks into water to increase the mineral content thereof.

SUMMARY OF THE INVENTION

According to the invention there is provided a method of packaging an aqueous liquid, the method including the steps of:
 charging a charge of the liquid through a closable opening into a container therefor;
 inserting, through the opening into the container and into contact with the liquid, a source of inorganic ions which are soluble in the liquid, the source comprising a carrier for said ions which is of a solid material which is insoluble in the liquid and has said ions sorbed thereto; and
 closing the opening to retain the liquid and source in the container, the method including, prior to the inserting of the source into the container, obtaining the source as rock from a rock deposit of a type found naturally in contact with mineral water deposits; and the method including, prior to inserting the source into the container, enclosing the source in a receptacle which is pervious to the liquid and in which receptacle the source is held captive, the method including inserting the receptacle, with the source held captive therein, into the container.

As used herein, the expression whereby ions are stated to be sorbed to the solid material means that they are absorbed therein and/or adsorbed thereon.

Closing the closable opening of the container may be by means of a closure for the opening, and may take place after the liquid has been charged into the container and after the source has been inserted into the container.

The method may include, prior to the charging of the liquid into the container, extracting the liquid, as mineral water, from a natural deposit of mineral water in contact with rock. The method may further include charging the mineral water as chemically untreated mineral water into the container, i.e. after the liquid has undergone no more than physical treatment such as filtering.

Instead, the method may include, prior to the charging of the liquid into the container, chemically treating the liquid to obtain chemically purified water which is then charged into the container.

In particular, the obtaining of the rock may be from a rock deposit in contact with a mineral water deposit. In this case the method may include, prior to charging the liquid into the container, extracting the liquid, as mineral water, from said mineral water deposit in contact with the rock deposit.

In particular, inserting the receptacle into the container may comprise resiliently deforming the receptacle to reduce the size of the receptacle, from a size which prevents the receptacle from passing through the container opening, to a reduced size which permits the receptacle to pass through the container opening, and then allowing the receptacle resiliently to reassume its unreduced size, so that the receptacle is held captive in the container.

Further according to the invention there is provided a liquid pack, the pack comprising:
 a container for holding a liquid and having a closable opening; and
 a source of inorganic ions contained in the container in contact with the liquid, the ions being soluble in the liquid and the source comprising a carrier for said ions which is of solid material which is insoluble in the liquid and has said ions sorbed thereto, the source being rock from a rock deposit of a type found naturally in contact with mineral water deposits; and the source being enclosed in a receptacle which is pervious to the liquid and in which receptacle the source is held captive.

The pack may include a closure, such as a lid, cork, stopper or cap, whereby the closable opening is closed.

The liquid may be chemically untreated mineral water. Instead, the liquid may be chemically treated water.

In particular, the water in the container may be extracted from a mineral water deposit which was in contact with said rock deposit. In other words, the liquid pack may contain mineral water from a mineral water deposit which is in contact with a rock deposit, the source in the container being rock from said rock deposit.

The receptacle may be flexibly deformable. In this case the receptacle may be of resilient material, being of a size which prevents it, in its undeformed state, from passing through the container opening, the receptacle being held captive in the container. The receptacle may be in the form of a cage, for example having openings through a wall thereof, so that it is net-like or foraminous in character. Instead, the receptacle may be of porous material, having pores, for example, of a more or less microscopic scale, through which the liquid is permeable, at least some of the ions dissolved in the liquid being permeable through the porous material. If desired the pore size of the material may be chosen to be selectively permeable to certain of the soluble ions sorbed to the source.

The soluble inorganic ions may include at least one cation selected from the group consisting of the cations of sodium, potassium, magnesium and calcium.

The invention extends further to a device for forming part of a pack as described above, the device comprising a source of inorganic ions, the ions being soluble in an aqueous liquid and the source comprising a carrier for said ions which is of solid material which is insoluble in aqueous liquids and has said ions sorbed thereto, and a receptacle which is pervious to aqueous liquids, the source being held captive in the receptacle, and the source being rock obtained from a rock deposit of a type found naturally in contact with mineral water deposits.

As indicated above, the solid source comprising the carrier may be of natural origin and may be a natural insoluble solid material which carries inorganic ions. Instead, the solid source may be a manufactured insoluble solid material that can sorb (absorb and/or adsorb) inorganic ions. The inorganic ions may be selectively added to the carrier, particularly if it is a manufactured solid material. The ions may be of sulphates, carbonates or the like, derived from the salts of magnesium, potassium, calcium or the like. The ions may be adsorbed on and/or absorbed in the carrier.

In a preferred embodiment of the invention, where the liquid is mineral water, the carrier is, as indicated above, a piece or fragment of rock found naturally at a place where the mineral water naturally occurs. Conveniently, the natural piece or fragment of rock has been in close proximity with or in contact with, the mineral water in its natural state. The piece of rock may be cleaned and/or sterilised prior to insertion into the liquid container; and the mineral water may be cleaned by filtering.

In a further embodiment of the invention, where the liquid is chemically treated water, the carrier may be a piece or fragment of natural rock carrying the abovementioned ions and/or having one or more of the abovementioned ions adsorbed on it and/or absorbed in it. It will be appreciated that such chemically treated water, when in contact with the rock, may assume a character more or less resembling that of natural spring mineral water found where such rock naturally occurs.

A receptacle which is pervious to the liquid and to at least some of said inorganic ions, may contain or enclose the source or carrier. In a preferred embodiment of the invention, the receptacle is of a size and/or shape to prevent it from escaping from the liquid container with which it is associated in the pack, via the container opening, once it has been inserted into the container. The preferred receptacle may be of a resiliently deformable material and may have openings defined in its wall. More preferably, the receptacle is in the form of a cage for the source. The cage may have protrusions arranged on, and extending outwardly from, its outer surface. The cage may be of any suitable shape, in particular it may be spherical.

The liquid will typically be for human consumption. Preferably, the liquid is a mineral water as defined above but may be any other potable aqueous liquid, including water which has been treated chemically to purify it.

It will be appreciated that in another embodiment the container and the receptacle may be of an integral or one-piece unitary construction, the container being partitioned to define separate regions, one of which comprises the receptacle.

The invention is now described, by way of example, with reference to the accompanying diagrammatic drawings.

BRIEF DESCRIPTION OF THE DRAWINGS

In the drawings,

FIG. 1 shows a side view of part of a pack in the form of a bottle of water in accordance with the invention, omitting its closure;

FIG. 2 shows a side view of a receptacle for a solid ion source for use as part of a device in accordance with the invention; and FIG. 3 shows a side view of a further embodiment of such receptacle.

DETAILED DESCRIPTION OF THE INVENTION

In FIG. 1 a pack in accordance with the invention is generally referred to by reference numeral 10.

The pack 10 includes a container 12 of a clear (transparent) plastics material. The container contains mineral water 13.

The pack 10 includes a fragment 14 of rock which is held captive within the container 12. The fragment 14 of rock was obtained from the rock strata with which the mineral water 13, in its natural state, was in contact before it was extracted for packaging, where a deposit of the rock was in contact with a deposit of the water.

The fragment 14 of rock is in turn held captive in a receptacle 16 which is in the form of a spherical cage having longitudinal ribs 18 and latitudinal ribs 19. The spherical cage is made of a resiliently deformable plastics material, is fully water pervious and allows the mineral water 13 access to the surface of the fragment 14 while the cage 16 and fragment 14 are immersed in the mineral water 13.

The fragment 14 of rock is of a size which allows it to be inserted into the container 12 at container opening (bottle neck) 21 which is then closed by a closure cap (not shown). The receptacle 16 containing the fragment 14 is resiliently and if necessary elastically deformable both to permit insertion of the fragment 14 into the receptacle 16 and to permit insertion of the receptacle 16 into the opening 21 of the container 12 while containing the fragment 14. The fragment 14 and receptacle 16 cannot be removed easily from the container 12 once they have been so inserted and the receptacle 16 has regained its original shape. The fragment 14 may be cleaned, e.g. by being washed, boiled, subjected to steam or ultra-violet light or the like. It may also be suitably reduced in size, e.g. by crushing, for example into particles.

In FIG. 2, a second embodiment of the receptacle 16 in the form of a spherical cage 20 with protrusions in the form of more or less radial spikes 22 on its surface 24 is shown.

In FIG. 3, a third embodiment of the receptacle 16 is shown in the form of a sphere 26 having holes 28 defined in its wall 30. The receptacles of FIG. 1, 2 or 3 may each be manufactured in two separate or hingedly attached parts.

It is to be appreciated that in another embodiment (not shown) the receptacle may have a surface which has openings of a predetermined size to restrict the movement of certain selected ions between the rock fragment 14 and the mineral water. Thus, the surface of the receptacle may be defined by a permeable or porous membrane which permits selectively the passage of preselected ions and inhibits the transfer of other preselected ions.

Once the mineral water 13 is removed from the rock strata with which it was in contact, the natural dynamic equilibria between the ions dissolved in the mineral water 13 and the ions sorbed to the rock strata are disturbed. These equilibria are comprised of the equilibria between the solid phases of the ions sorbed to the rock strata and the ions of ionised salts, for example, calcium and magnesium ions, in solution, as reflected by the solubility product constants of the salts present. The solubility of any one difficultly soluble salt is affected by other commonly occurring ions in solution. The equilibria and, therefore, the solubility constants are also affected by the other ions in solution and by the ambient temperature.

The applicant is aware that mineral water is typically collected from springs, boreholes and wells. It is sometimes purified by physical treatment, such as filtration or irradiation with ultra-violet light, before being packaged in bottles, flagons, bulk containers or the like, for eventual distribution to markets. The water so packaged is regarded as pure according to certain standards which may be laid down by regulatory authorities. Such mineral water contains various inorganic ions in solution which arise from rock strata from which the mineral water has been extracted and with which it has been in contact or through which it has passed. Typically, no further treatment or processing steps are carried out in the water, other than the physical treatment, packaging and distribution mentioned above.

In other words, once mineral water has been extracted from natural deposits in which it is in contact with rock strata, only physical purification such as filtration (but no chemical treatment) and packaging are carried out on the mineral water before it reaches the consumer. Furthermore, no cognisance is given to the fact that the inorganic ion content of the mineral water derives from the ionic equilibria which exist between the water and the strata at the deposit from which the water has been extracted, and from the chemical composition and character of the minerals which make up such strata. When ionic equilibria are established within a rock stratum between the solid phases constituted by the minerals of the rock stratum and the ions of salts in solution in mineral water in contact with the stratum, such equilibria are commonly determined as the solubility product constant or so-called solubility product of each such salt. Such ions may be, for example, but are not limited to, calcium and magnesium ions. The solubility of any single difficultly soluble salt, for example calcium carbonate but not limited thereto, is affected by other ions commonly found in solution. In the case of difficultly soluble calcium carbonate, carbonate ions are commonly found in mineral water, having been released into solution from other minerals in the rock strata. The equilibria, and thus the solubility products, are also affected by the temperature of the deposit. Once mineral water is extracted from the deposit and removed from the rock strata, the equilibria can be disturbed. It would be desirable, thus, to provide mineral water or other aqueous liquids for human consumption, for example water which has been chemically treated to a limited extent, so that it is no longer considered to be a mineral water as defined above, in which such equilibria are promoted or maintained. According to the invention rock from such strata can act, as described above, as sources of inorganic ions which are soluble in such aqueous liquids, the sources comprising carriers for said ions which carriers are of solid materials which are insoluble in the liquid and have the ions in question sorbed thereto.

The applicant proposes that it is advantageous to provide a means of maintaining or promoting maintenance of the natural dynamic ionic equilibria encountered in mineral water 13 in its natural state with the rock strata with which it was in contact before it was extracted. Similar equilibria can also be promoted in chemically treated water. Furthermore, for persons concerned in the mineral content of mineral water, the presence of the rock fragment will act as a clear reminder of the natural origin or character of the mineral water in question, and of the ions dissolved therein.

What is claimed is:

1. A method of packaging an aqueous liquid, the method including the steps of:
   charging a charge of the liquid through a closable opening into a container therefor;
   inserting, through the opening into the container and into contact with the liquid, a rock fragment forming a source of inorganic ions which are soluble in the liquid, the source comprising a carrier for said ions which is of solid material which is insoluble in the liquid and has said ions sorbed thereto;
   closing the opening to retain the liquid and rock fragment in the container; and
   prior to inserting the rock fragment into the container, enclosing the rock fragment in a receptacle which is in the form of a resilient cage, in which resilient cage the rock fragment is held captive, the method including inserting the cage, with the rock fragment held captive therein, into the container by resiliently deforming the cage to reduce the size of the cage from a size which prevents the cage from passing through the container opening, to a reduced size which permits the cage to pass through the container opening, and allowing the cage resiliently to re-assume its unreduced size, so that the cage is held captive in the container.

2. A method as claimed in claim 1, which includes, prior to the charging of the liquid in to the container, extracting the liquid, as mineral water, from a natural deposit of mineral water in contact with a rock deposit.

3. A method as claimed in claim 2, which includes charging the mineral water as chemically untreated mineral water into the container.

4. A method as claimed in claim 2, which includes obtaining the rock fragment from the rock deposit in contact with the mineral water deposit.

5. A method as claimed in claim 1, which includes, prior to the charging of the liquid into the container, chemically treating the liquid to obtain chemically purified water which is then charged into the container.

6. A liquid pack comprising:
   a container for holding a liquid and having a closable opening;
   an aqueous liquid contained in the container; and
   a rock fragment forming a source of inorganic ions contained in the container in contact with the liquid, the ions being soluble in the liquid and the rock fragment forming a carrier for said ions which is of solid material which is insoluble in the liquid and has said ions sorbed thereto, the rock fragment being enclosed in a receptacle which is in the form of a resilient cage, in which resilient cage the rock fragment is held captive, the resilient cage being resiliently and flexibly deformable, being of resilient material and of a size which prevents it, in its undeformed state, from passing through the opening of the container, the resilient cage being held captive in the container.

7. A pack as claimed in claim 6, in which the cage is of porous material.

8. A pack as claimed in claim 6, in which the soluble inorganic ions include at least one cation selected from the group consisting of the cations of sodium, potassium, magnesium and calcium.

9. A pack as claimed in claim 6, in which the liquid is water extracted, as mineral water, from a natural deposit of mineral water in contact with a rock deposit.

10. A pack as claimed in claim 9, in which the rock fragment is a rock fragment obtained from the rock deposit in contact with the mineral water deposit.

11. A pack as claimed in claim 6, in which the aqueous liquid is transparent, the container being a bottle of transparent material, having a tapering bottle neck leading to the closable opening.

12. A pack as claimed in claim 6, in which the cage has a plurality of protrusions in the form of spikes protruding outwardly therefrom.

13. A device for forming part of a pack comprising an aqueous liquid contained in a container, the device comprising a rock fragment forming a source of inorganic ions, the ions being soluble in an aqueous liquid, the rock fragment comprising a carrier for said ions which is of solid material which is insoluble in aqueous liquids and has said ions sorbed thereto, and a receptacle in the form of a resilient cage, the rock fragment being held captive in the resilient cage, and the cage being flexibly deformable, being of resilient material and being resiliently deformable to reduce the size thereof, and in its reduced size, being capable, upon release thereof, of resiliently re-assuming its original unreduced size.

14. A device as claimed in claimed in claim 13, in which the rock fragment is obtained from a rock deposit in contact with a mineral water deposit.

15. A device as claimed in claim 13, in which the cage has a plurality of protrusions in the form of spikes protruding outwardly therefrom.

* * * * *